United States Patent [19]
Nakatani et al.

[11] Patent Number: 5,347,531
[45] Date of Patent: Sep. 13, 1994

[54] TRANSVERSE DISCHARGING EXCITATION PULSE LASER OSCILLATOR APPARATUS

[75] Inventors: Hajime Nakatani; Atsushi Sugitatsu, both of Amagasaki, Japan

[73] Assignee: Mitsubishi Denki Kabushiki Kaisha, Tokyo, Japan

[21] Appl. No.: 752,573

[22] PCT Filed: Feb. 8, 1991

[86] PCT No.: PCT/JP91/00159

§ 371 Date: Oct. 2, 1991

§ 102(e) Date: Oct. 2, 1991

[87] PCT Pub. No.: WO92/14285

PCT Pub. Date: Aug. 20, 1992

[51] Int. Cl.$^5$ .............................................. H01S 3/097
[52] U.S. Cl. ........................................ 372/86; 372/83; 372/88
[58] Field of Search ................................ 372/87, 86, 82

[56] References Cited

U.S. PATENT DOCUMENTS 4,718,072 1/1988 Marchetti et al. .

FOREIGN PATENT DOCUMENTS 57-88789 6/1982 Japan .

OTHER PUBLICATIONS

E. Armadillo et al.; "Simple, compact, high-repetition rare XeCl laser"; Rev. Sci. Instrum, 56(5), May 1985; pp. 674–676.

*Primary Examiner*—Leon Scott, Jr.
*Attorney, Agent, or Firm*—Oblon, Spivak, McClelland, Maier & Neustadt

[57] ABSTRACT

This invention relates to a transverse discharge pumping type pulse laser oscillating device including an electron capturing gas, especially to the configuration of preliminary ionization electrodes (4a, 4b, 8a, 8b). A transverse discharge exciting type pulse laser oscillating device according to this invention has preliminary ionization parts such that the dominant parts of corona discharge are directed to the part between main electrodes (1,2) and the developing lengths (1) of the corona discharge are long. The long developing lengths (1) increase the quantity of emitted ultraviolet rays and the electrodes (4a, 4b, 8a, 8b) are so arranged that the air between the main electrodes (1,2) is irradiated with ultraviolet rays emitted from near the initiating regions of the corona discharge, the initiating regions emitting light whose intensity is greater than those of other regions in the corona discharges. Thereby, a homogeneous main discharge is obtained and the efficiency of the laser oscillation is improved.

12 Claims, 5 Drawing Sheets

TRANSVERSE DISCHARGING EXCITATION PULSE LASER OSCILLATOR APPARATUS

TECHNICAL FIELD

The present invention relates to a transverse discharging excitation pulse laser oscillator apparatus including electron affinity gas, and in particular relates to the constitution of its pre-ionization electrodes.

BACKGROUND ART

FIG. 5 is a cross-sectional drawing showing a discharging electrode of a conventional transverse discharge excitation pulse laser oscillator apparatus shown for example in DOE/SF/ 90024-T2 (1977) wherein: (1) is a first main electrode; (1a) is a ¼ inch outer diameter tube which constitutes a tip part of the main electrode (1); (2) is a second main electrode; (3) is a main discharge which is produced between main discharge (1) and (2); (4) is an auxiliary electrode comprised of a wire disposed in the vicinity of the first main electrode (1); (5) is a dielectric material pipe comprised of quartz pipe of approximately 5 mm outer diameter which is disposed in a manner that it contains thee auxiliary electrode (4) inside and contacts the first main electrode (1); (6a) and (6b) are corona discharges taking place on the surface of the dielectric material pipe; and (7a) and (7b) are corona discharge starting points.

Next, explanation is given on its action. First, upon applying a voltage across the first main electrode (1) and the auxiliary electrode (4), corona discharges (6a) and (6b) start from a points (7a) and (7b) at which dielectric material (5) and the first main electrode (1) contact each other in a manner that they cover the dielectric material pipe (5). Ultra-violet radiation is radiated from these corona discharges (6a) and (6b), thereby laser gas existing between the main electrodes (1) and (2) is pre-ionized. Subsequently, when a voltage is applied across the main electrodes (1) and (2), pre-ionized gas starts to discharge and then the main discharge (3) takes place. The laser gas is excited by this main discharge (3), thereby the laser starts to oscillate in a direction which is perpendicular with respect to the plane of sheet. Since the conventional transverse discharge excitation pulse laser oscillator apparatus is constituted as has been described above, there has been a problem that the ultra-violet radiation taking place in the vicinity of the corona discharge starting points (7a) and (7b), at which light emission caused by the corona discharge was strong, was not radiated efficiently into the space between the main discharge electrodes (1) and (2).

SUMMARY OF THE INVENTION

The present invention has been done in consideration of the problem as has been described above, light-emission amount of the ultra-violet radiation can be made strong and, in addition to that, by taking a configuration through which this ultra-violet radiation can be illuminated efficiently into the space between the main electrodes, even in the case that a strong electron affinity gas such as $F_2$ gas is included in the laser gas, a uniform discharge can be realized., thus as a result, it purposes to obtain a transverse discharge excitation pulse laser oscillator apparatus which can oscillate with a high efficiency.

In a transverse discharge excitation pulse laser oscillator apparatus in accordance with the present invention, by making the extension length of the corona discharge long, a pre-ionized discharge is constituted in a manner that a strong part of the corona discharge is directed toward the space between the main electrodes. Owing to such the constitution, also by making the extension length of the corona discharge long, the light-emission amount of the ultra-violet radiation is enhanced, and the electrodes are disposed in a manner that the ultra-violet radiation taking place in the vicinity of the corona discharge starting point at which the light-emission amount is strong among the corona discharges can illuminate the air in the space between the main electrodes.

BEST MODE FOR CARRYING OUT THE INVENTION

Figure 1:
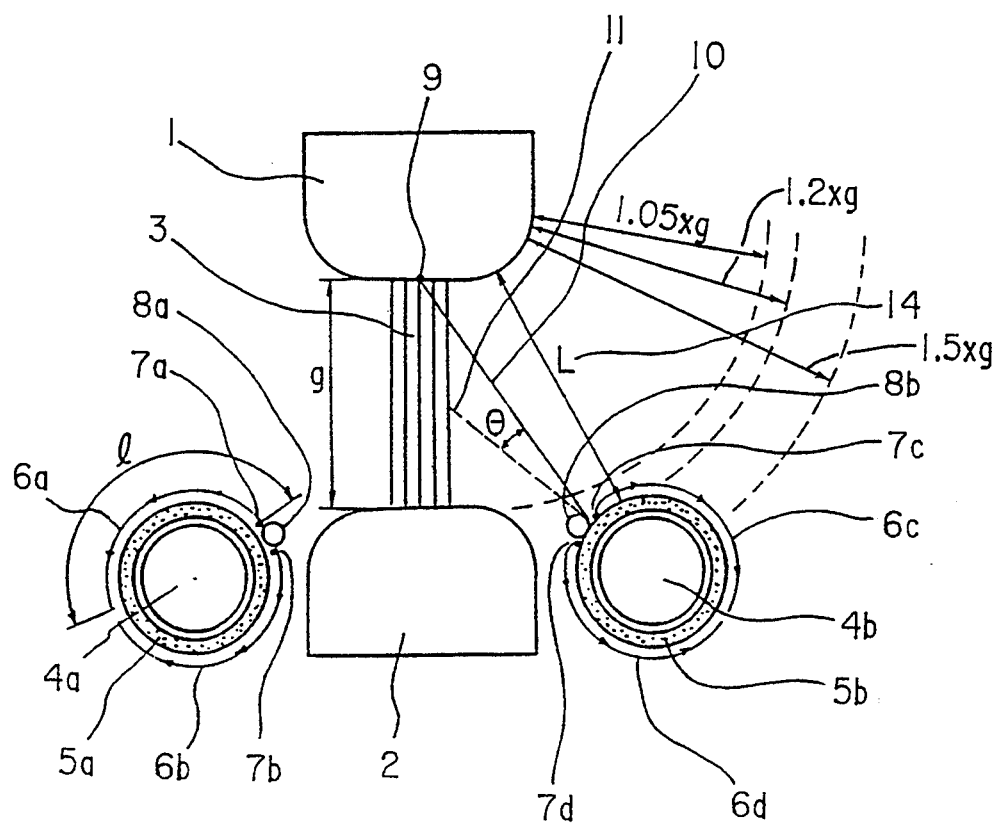
FIG. 1 is a side cross-sectional view showing a transverse discharge excitation pulse laser oscillator apparatus in accordance with one embodiment of the present invention.

In the following, explanation is given on one embodiment of the present invention referring to drawings. FIG. 1 is a cross-sectional view in a plane perpendicular with respect to the laser oscillation optical axis of the a transverse discharge excitation pulse laser oscillator apparatus, and in the drawing, (4a) and (4b) are auxiliary electrodes of cylindrical shape which are disposed at a distance on both sides of a second main electrode (2), (5a) and (5b) are dielectric material pipes having almost the same inner diameter as an outer diameter of the auxiliary electrodes (4a) and (4b), and in this case, they are made of alumina ceramics composed of alumina as its main composition. (8a) and (8b) are corona starting electrodes which are wire-shaped conductors disposed at parts near the main electrodes (1) and (2) among the outer peripheries of the dielectric material pipes (5a) and (5b) in a manner that they are kept at the same potential as that of the second main electrode (2), then (6a), (6b), (6c), and (6d) are corona discharges, (7a), (7b), (7c), and (7d) are corona discharge starting points at which the corona discharges (6a), (6b), (6c), and (6d) starts, (9) is a center point of the electrode surface of the first main electrode (1) which is facing to the second main electrode (2), (10) is a first direction determined by a straight line connecting between the corona starting point (7c) and the center point (9), (11) is a straight line obtained by an intersection of a plane which is perpendicular with respect to an extending direction of the corona discharge (6a) on the periphery of the corona starting electrode (8b) and a plane which is perpendicular with respect to a laser oscillation optical axis, and it indicates a second direction.

Upon applying a voltage across the second main electrode (2) and the auxiliary electrodes (4a) and (4b), an electrical field concentration takes place in the vicinity of the corona starting electrodes (8a) and (8b) which are connected in a manner that they keep the same potential as that of the second main electrode (2), then corona discharge starts first at those parts of (7a), (7b), (7c), and (7d) at which the corona starting electrodes (8a) and (8b) are close to- the dielectric material pipes (5a) and (5b). The constitution of this drawing corresponds to a case of the surface-propagating corona discharge in the case of the presence of electrodes in the back surface, the corona discharges starting from the corona discharge starting points (7a), (7b), (7c), and (7d) develops along the surface of the dielectric material pipes (5a) and (5b) to form corona discharges (6a), (6b), (6c), and (6d). The extension length of the corona discharge (6a) is indicated by a notation 1. The extension length 1 of the corona discharge equals approximately a half of the outer circumferential length of the dielectric material pipe (5) in this case.

In FIG.2, various shapes of the corona discharges as well as the corona discharge extension lengths thereof are shown. FIG.2(a) shows a case that two corona starting electrodes (8a) and (8b) are disposed on the surface of the dielectric material pipe (5) composed of cylindrical pipe, FIG.2(b) shows a case that four corona starting electrodes (8a), (8b), (8c), and (8d) are disposed on the surface of the dielectric material pipe (5) composed of cylindrical pipe, FIG. 2(c) shows a case that one corona starting electrode (8) is disposed on the surface of the dielectric material pipe (5) composed of square-shaped pipe, and FIG. 2(d) shows a case that a corona starting electrode (8) is wound spirally on the surface of the dielectric material pipe (5) composed of cylindrical pipe. In FIG. 1 and FIGS. 2(a), (b), and (c), the corona starting electrodes are electrodes extending in the direction perpendicular with respect to the plane of the sheet. As in the case of FIG. 1 and FIG. 2(c), in case that only one corona starting electrode (8) is present on the periphery of the dielectric material pipe (5), and in addition to that, it is extended in the direction of laser optical axis, the extension length 1 of the corona discharge equals approximately a half of the circumferential length of the dielectric material pipe (5) when it is seen on a cross-section perpendicular to the laser optical axis. On the other hand, as in FIG. 2 (a), (b), and (d), in case that corona starting electrodes (8) are disposed with a constant pitch on the periphery of the dielectric material pipe (5), the extension length 1 of the corona discharge equals approximately a half of this pitch. As the result that the light-emission amount from the corona discharge was measured on various shaped electrodes, it has been found that, as far as the outer shape of the dielectric material pipe (5) was the same, configurations of FIG. 1 and FIG. 2(c) could give the greatest amount of light emission. For example, in the case of FIG. 2(a) in which the corona discharge extension length becomes half comparing with FIG. 1, the light-emission amount of ultra-violet radiation also becomes half. And, in the case of FIG. 2(b) in which the corona discharge extension length becomes ¼ comparing with FIG. 1, the light-emission amount of ultra-violet radiation diminishes to ¼. That is, it was found that, in spite of covering almost all over the surface of the dielectric material pipe (5) with the corona discharge (6), an electrode configuration having a longer corona discharge extension length could give more emission amount of ultra-violet radiation, and in addition to that, the emission amount of ultra-violet radiation was proportional to the extension length 1 of the corona discharge. And, precise measurements of the emission amount of the ultraviolet radiation from the corona discharge (6) revealed that the the emission amount was great in the vicinity of corona discharge starting points (7) and it diminished as proceeding up to the tip of the corona discharge (6).

From the result described above, it was revealed that by making the extension length 1 of the corona discharge longer and disposing the corona discharge starting points (7) in a manner that they faced to the place at which the main discharge (3) took place, the amount of the pre-ionization could be increased. And, since, due to the corona discharge (6), the ultra-violet radiation propagates in the gas space while it is diverging, moreover it is absorbed by gas on its way of propagation, a closer disposition of the occurrence points of the corona discharges (6) to the main electrodes (1) and (2) can make the amount of the pre-ionization more. However, since an excessive proximity of the dielectric material pipes (5) to the first main electrode (1) eventually introduces a discharge between the first main electrode (1) and the corona starting electrodes (8), it is necessary to separate them with keeping greater distance than a certain extent. Since the first main electrode (1) is disposed at a more distant point from the corona discharge (6) than the second main electrode (2) is, it is desirable to select a position at which the ultra-violet radiation is efficiently illuminated on the main electrode (1). That is, in FIG. 1, since the ultra-violet radiations of strong intensity emitted in the vicinity of the corona discharge starting points (7) is strongly radiated in a second direction (11), at a time when this second direction (11) coincides with the first direction (10) connecting the center point (9) of the first main electrode (1) and the corona discharge starting points (7c), the amount of the pre-ionization becomes largest. Denoting the angle between the first direction (10) and the second direction (11) to be $\theta$, the amount of the preionization becomes proportional to $\cos\theta$.

Actual experiments using an excimer laser Including fluorine gas at gap lengths g=10-30 mm showed that;

laser oscillations with a comparatively high efficiency could be obtained, if, (1) when $\theta$=0-72.5 degrees, I is such that, I=1-×$\cos\theta$=3 mm or more, (2) and when 0=more than 72.5 degrees (in case that the corona discharge starting point (7) is hidden back side), I is such that, I=1×0.3=3 mm or more.

In the above equations, parameter I is a quantity expressing the strength of the pre-ionization. If I=5 mm or more, the laser oscillation efficiency increases further (3% or more). In a case that the corona discharge (6) is carried out at only one side of the main discharge (2) as is shown in FIG. 1. it is necessary to take a value of the parameter I to be twice as the abovementioned value.

And, it is found that, when the minimum separation distance L (14) between the first main electrode (1) and the dielectric material pipes (5) is taken to be 1.05 times or more and 1.5 tithes or less of the minimum gap length g between the first main electrode (1) and the second main electrode (2), the laser oscillates in a good efficiency, and moreover, no arc discharge takes place between the first main electrode (1) and the dielectric material pipes (5). In FIG. 1, the minimum separation distance L (14) between the first main electrode (1) and the dielectric material pipes (5) is taken to be 1.17 times the minimum gap length g.

Figure 3:
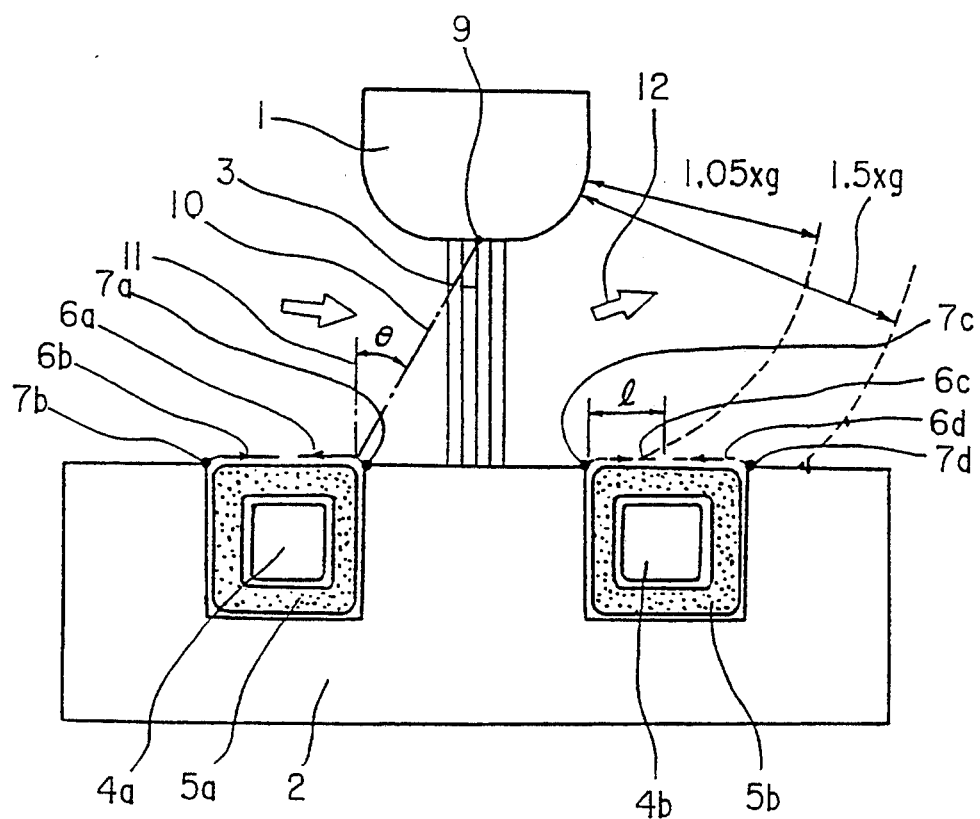
FIG. 3 and FIG. 4 are side cross-sectional views of transverse discharge excitation pulse laser oscillator apparatus showing other embodiments of the present invention.

FIG.3 is a side cross-sectional view showing other embodiment of the present invention. The dielectric material pipes (5) are disposed in such a manner as they are burled In on both sides of the center part of the second maln electrode (2). And, the corona starting electrodes (8) take a unitary construction with the second main electrode (2). By taking this construction, the corona starting electrodes (8) can be omitted and thereby not only the configuration becomes simple, but also, in case that a gas flow (12) is let being flowing between the main electrodes (1) and (2), it becomes possible to let the gas flow in a high speed owing that there is no obstacle impeding against the gas flow. Therefore, it is convenient to operate the laser in a high repetition rate mode.

Figure 4:
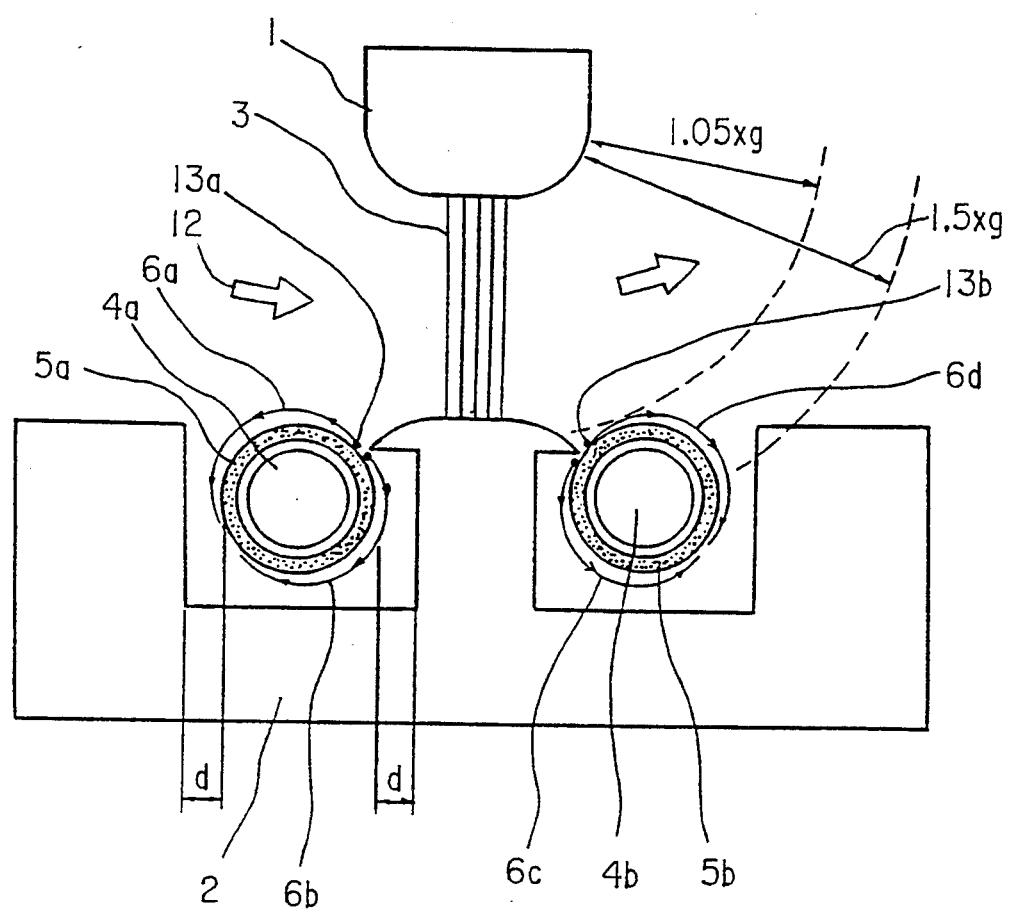
Figure 5:
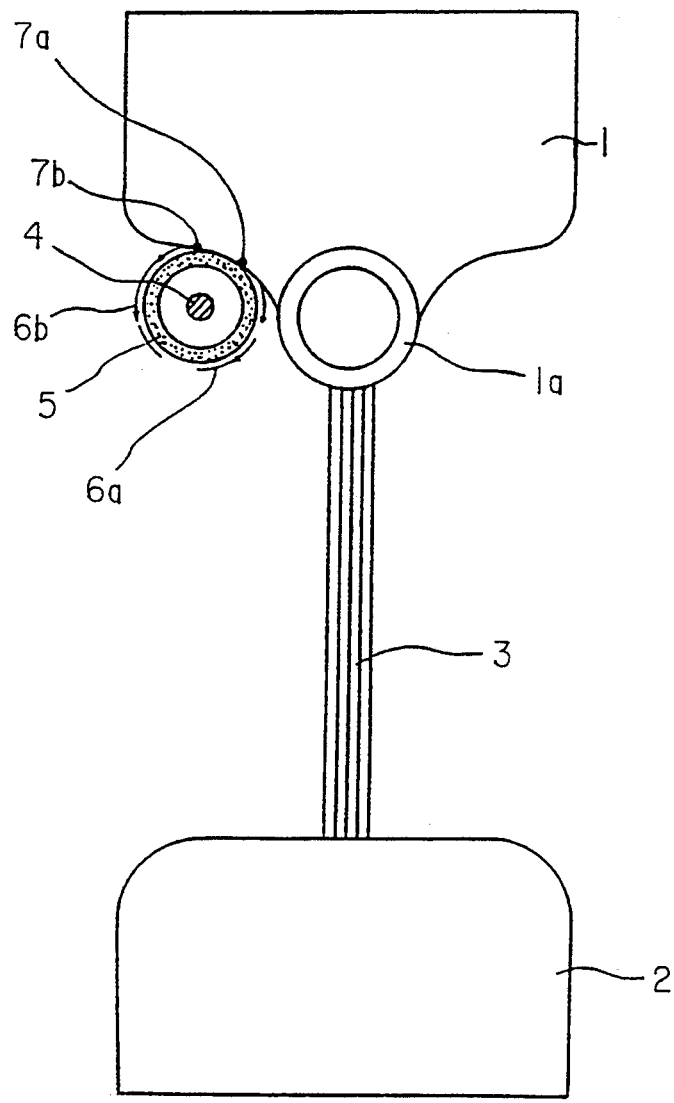
FIG. 5 is a side cross-sectional view of a transverse discharge excitation pulse laser oscillator apparatus of prior art.

FIG.4 is a side cross-sectional view showing another embodiment of the present invention. The dielectric material pipes (5a) and (5b) are disposed in such a manner as they are buried in the second main electrode (2) and at the same time the dielectric material pipes (5a) and (5b) are disposed with letting them floating from the second main electrode (2) so that they can keep a distance d or more except that they come close thereto or they make contact with the second main electrode (2) at its parts (13a) and (13b). If the distance d is made thicker than the thickness of the dielectric material pipe (5), the corona discharge (6) is extended on its extension length as is shown in FIG. 4, thereby the pre-ionization amount can be increased. And, since the dielectric material pipes (5) are disposed in such a manner as they are buried in the second main electrode, they cannot be an obstacle against the gas flow (12) and hence the gas can be circulated with a high speed, hence a high repetition rate operation of the laser becomes possible.

Figure 2A:
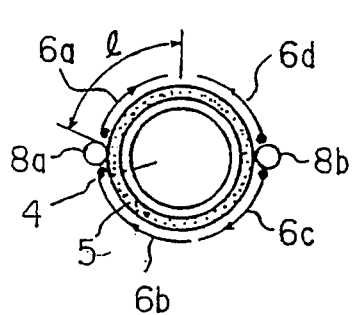
FIGS. 2a–2d are side cross-sectional view of a corona discharge part for explaining a corona discharge extension length of the present invention.
Figure 2B:
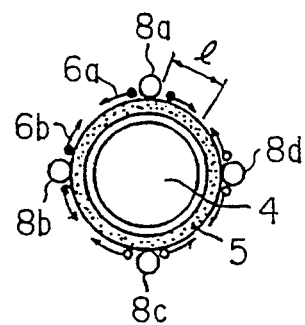
Figure 2C:
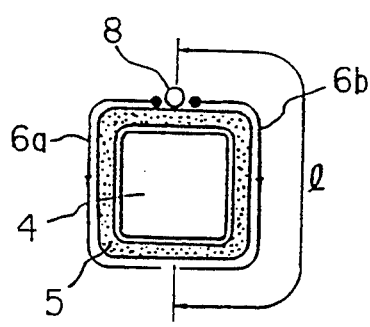
Figure 2D:
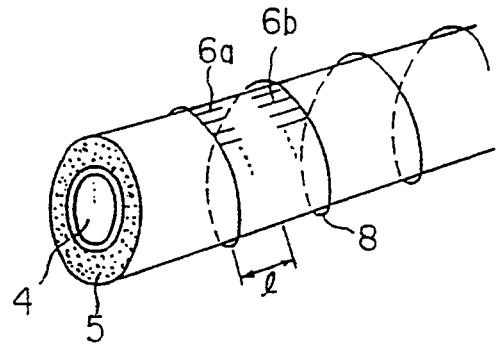

And, although, in FIG. 1, FIG. 2(a), (b), and (c), the corona starting electrodes (8) were taken to be a uniform shape in the laser optical axis direction, a nonuniform shape such as, for example, having projections sporadically along the laser optical axis can also exhibit the same effect.

Also, although explanation has been given on a case using an alumina ceramics containing alumina as its main composition as for the dielectric material on an excimer laser case, certain other materials can also exhibit the same effect for different laser cases.

As has been described above, according to the present invention, owing to the lengthening of the extension length of the corona discharge and the preionization by the illumination of ultra-violet radiation emitted from a strong part of the corona discharge on the laser gas between the main electrodes, a uniform main discharge can be obtained and thereby the laser oscillation efficiency becomes high.

What is claimed is:

1. A transverse discharge excitation pulse laser oscillation apparatus comprising:
   a first main electrode;
   a second main electrode facing the first main electrode along an optical axis and separated from the first main electrode by a distance g;
   a hollow pipe formed of a dielectric material and disposed on one side of the second main electrode in a direction perpendicular to the optical axis;
   an auxiliary electrode formed within the hollow pipe;
   at least one corona starting electrode in contact with the hollow pipe, the corona starting electrode being at a same potential as the second main electrode, wherein a corona discharge starts from the corona starting electrode and extends over a surface of the hollow pipe and generates ultraviolet radiation;
   a laser gas disposed between said first and second main electrodes, the laser gas being pre-ionized by the generated ultra-violet radiation to thereby produce a uniform main discharge between said first and second main electrodes;
   where a distance l represents one half one an outer circumferential length of the hollow pipe divided by a number of corona starting electrodes, a first direction is defined by a straight line between a point where corona discharge starts at the corona starting electrodes and a center of a face of the first main electrode facing the second main electrode, a second direction is defined by a straight line perpendicular to a direction in which the corona discharge develops, an angle $\theta$ representing an angle produced between the first and second directions,
   wherein for $\theta < 72.5$ degrees, $l \times \cos \theta > 6$ mm; and
   wherein for $\theta \geq 72.5$ degrees, $l \times N > 6$ mm,
   where N is a fixed value of 0.3.

2. The transverse discharge excitation pulse laser according to claim 1, wherein L represents a minimum distance between the first main electrode and the hollow pipe, and $$1.05 \, L \leq g \leq 1.5 \, L.$$

3. The transverse discharge excitation pulse laser according to claim 1, wherein the two hollow pipes are formed of alumina ceramics.

4. The transverse discharge excitation pulse laser according to claim 1,
   wherein for $\theta < 72.5$ degrees, $l \times \cos \theta > 10$ mm; and
   wherein for $\theta \geq 72.5$ degrees, $l \times N > 10$ mm.

5. A transverse discharge excitation pulse laser oscillator apparatus comprising:
   a first main electrode;
   a second main electrode facing the first main electrode along an optical axis and separated from the first main electrode by a distance g;
   two hollow pipes formed of a dielectric material and symmetrically disposed on opposite sides of the second main electrode in directions perpendicular to the optical axis;
   an auxiliary electrode formed within each of the two hollow pipe;
   at least one corona starting electrode in contact with each of the two hollow pipes, the corona starting electrode being at a same potential as the second main electrode, wherein a corona discharge starts from the corona starting electrode and extends over a surface of each of the two hollow pipes and generates ultra-violet radiation;
   a laser gas disposed between said first and second main electrodes, the laser gas being pre-ionized by the generated ultra-violet radiation to thereby produce a uniform main discharge;
   where a distance l represents one half of an outer circumferential length of each of the two hollow pipes divided by a number of corona starting electrodes, a first direction is defined by a straight line between a point where corona discharge starts at the corona starting electrodes and a center of a face of the first main electrode facing the second main electrode, a second direction is defined by a straight line perpendicular to a direction in which the corona discharge develops, an angle $\theta$ representing an angle produced between the first and second directions, wherein for $\theta < 72.5$ degrees, $1 \times \cos \theta > 3$ mm; and wherein for $\theta \geq 72.5$ degrees, $1 \times N > 3$ mm, where N is a fixed value of 0.3.

6. The transverse discharge excitation pulse laser according to claim 5, wherein L represents a minimum distance between the first main electrode and each of the two hollow pipes, and $$1.05 \, L \leq g \leq 1.5 \, L.$$

7. The transverse discharge excitation pulse laser according to claim 5, wherein each of the two hollow pipes are formed of alumina ceramics.

8. The transverse discharge excitation pulse laser according to claim 5,
wherein for $\theta < 72.5$ degrees, $1 \times \cos \theta > 5$ mm; and wherein for $\theta \geq 72.5$ degrees, 9. A transverse discharge excitation pulse laser oscillator apparatus comprising:
a first main electrode;
a second main electrode facing the first main electrode along an optical axis and separated from the first main electrode by a distance g;
two hollow pipes formed of a dielectric material and symmetrical disposed on opposite sides of the second main electrode in a direction perpendicular to the optical axis;
an auxiliary electrode formed within each of the two hollow pipes;
a corona starting means facing each of the two hollow pipes, the corona starting means being at a same potential as the second main electrode, wherein a corona discharge starts from the corona starting means and extends over a surface of each of the two hollow pipes and generates ultra-violet radiation;
a laser gas disposed between said first and second main electrodes, the laser gas being pre-ionized by the generated ultra-violet radiation to thereby produce a uniform main discharge;
where a distance 1 represents one half of an outer circumferential length of each of the two hollow pipes, a first direction is defined by a straight line between a point where corona discharge starts at the corona starting electrodes and a center of a face of the first main electrode facing the second main electrode, a second direction is defined by a straight line perpendicular to a direction in which the corona discharge develops, an angle $\theta$ representing an angle produced between the first and second directions,
wherein for $\theta < 72.5$ degrees, $1 \times \cos \theta < 3$ mm; and wherein for $\theta \geq 72.5$ degrees, $1 \times N > 3$ mm, where N is a fixed value of 0.3.

10. The transverse discharge excitation pulse laser according to claim 9, wherein L represents a minimum distance between the first main electrode and each of the two hollow pipes, and $$1.05 \, L \leq g \leq 1.5 \, L.$$

11. The transverse discharge excitation pulse laser according to claim 9, wherein each of the two hollow pipes are formed of alumina ceramics.

12. The transverse discharge excitation pulse laser according to claim 9,
wherein for $\theta < 72.5$ degrees, $1 \times \cos \theta > 5$ mm; and wherein for $\theta \geq 72.5$ degrees, $1 \times N > 5$ mm.

* * * * *

UNITED STATES PATENT AND TRADEMARK OFFICE
CERTIFICATE OF CORRECTION

PATENT NO. : 5,347,531
DATED : September 13, 1994
INVENTOR(S) : Hajime NAKATANI, et al.

It is certified that error appears in the above-indentified patent and that said Letters Patent is hereby corrected as shown below:

On the title page, Item [86], the PCT Number should read: --PCT/JP91/00153--

Signed and Sealed this

Twenty-second Day of November, 1994

Attest:

BRUCE LEHMAN

*Attesting Officer*  *Commissioner of Patents and Trademarks*